Nov. 21, 1961   L. G. OTTO ET AL   3,009,719

LOCKING MORTISE AND TENON JOINT

Filed June 19, 1959

INVENTOR.
LYLE G. OTTO
WAYNE BEARDSLEE
BY
Richard A. Parsons
ATTORNEY

United States Patent Office 3,009,719
Patented Nov. 21, 1961

3,009,719
LOCKING MORTISE AND TENON JOINT
Lyle G. Otto and Wayne E. Beardslee, Charlotte, Mich., assignors to Aluminum Extrusions, Inc., Charlotte, Mich., a corporation of Michigan
Filed June 19, 1959, Ser. No. 821,576
3 Claims. (Cl. 287—54)

This invention relates to mortise and tenon joints between two parts, such as the legs and stretchers used in furniture, and more particularly to locking joints therefor.

The principal object of the invention is to provide a simple, effective locking joint for structural parts that is easily assembled.

Another object is to provide such a joint that is easily constructed.

A still further object is to provide such a joint that can be easily made in connection with extruded metal tubes.

These objects are attained in part by forming one part as a metal extrusion, with a portion of the locking means, a pair of wedge-shaped ribs, formed integrally therewith.

These objects are also attained in part by forming two mortises in one part and two tenons on the other part of coaxial arcuate shape whereby the two may be locked together by simply inserting the tenons into the mortises and rotating the former with the part to which they are attached.

In the drawings forming a part of this application:

Figure 1:
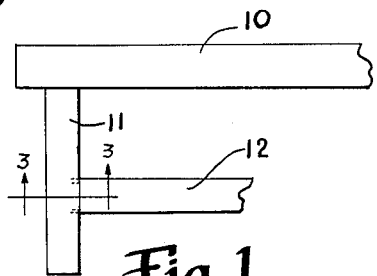
FIGURE 1 is a fragmentary elevational view of a table in which the joint is used.

Referring now to the drawings in more detail, FIGURE 1 illustrates an article of furniture such as a table 10 having legs 11 and stretchers 12. The stretchers are connected to the legs by the joint which constitutes this invention.

Preferably the legs 11 and stretchers 12 are formed of extruded metals such as aluminum. The legs are preferably square in cross-section, as are the stretchers, to harmonize more effectively with the legs, but the stretchers may be oval or cylindrical.

On at least two adjacent interior surfaces of the legs are pairs of elongated wedge-shaped ribs 13 and 14 formed when the legs are extruded in the die. These ribs form a shallow V between them.

Figure 2:
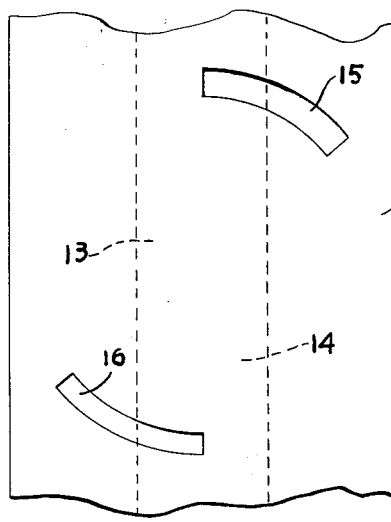
FIGURE 2 is a fragmentary elevational view of one side of the table leg.

Cut through those walls of the legs to which stretchers are to be attached are two diametrically opposed coaxial arcuate mortises 15 and 16 forming partial circles. As will be noted in FIGURE 2, the length of these mortises is substantially greater than the width of the respective ribs, and each mortise cuts completely through a rib, preferably terminating in the center of the V. While diametrically opposed, they are spaced on opposite sides of the longitudinal center line of the wall in which they are formed.

Figure 3:
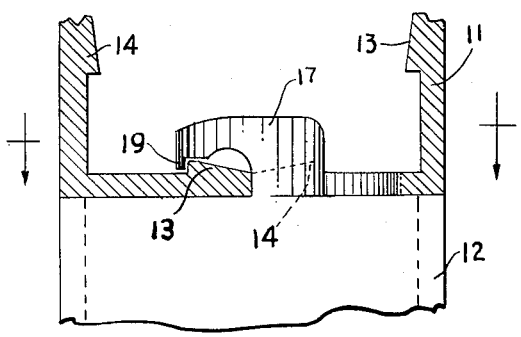
FIGURE 3 is a fragmentary cross-sectional view taken on substantially the line 3—3 of FIGURE 1.

Formed on the ends of the stretchers 12 are pairs of tenons 17 and 18. They are generally L-shaped in elevation (as seen in FIGURE 3) and are preferably formed integrally with the stretchers. Approximately half of each tenon is attached to one end of the stretcher, while the other half is free. The free ends of the tenons are provided with short lugs 19 extending toward the wall of the leg, and the distance between the ends of the lugs and the end of the stretcher is slightly less than the combined thickness of the wall of the leg and the thickest part of the ribs, about on the order of .015" to .020". The part of the free end of each tenon just inside of the leg 19 thereon should be the same, or very slightly less than the thickness of wall and rib.

Figure 4:
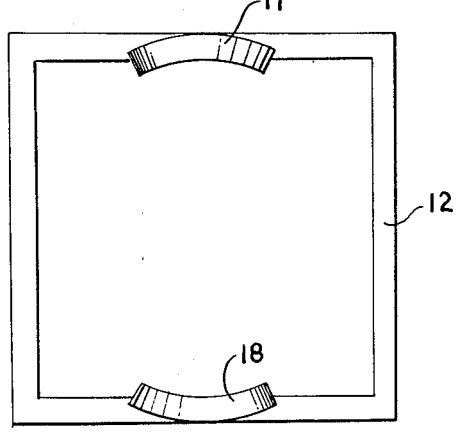
FIGURE 4 is an end view of the stretcher of the table.

The tenons 17 and 18 are bent into an arcuate shape in end elevation to pass through the mortises 15 and 16 (see FIGURE 4) and are about the same length as the mortises.

Figure 5:
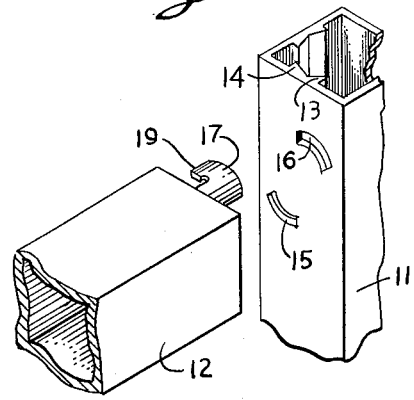
FIGURE 5 is a fragmentary pictorial view with the parts separated to better illustrate the construction of the joint.

To assemble the joint the tenons 17 and 18 are inserted into the mortises 15 and 16 respectively and the stretcher is rotated (counter-clockwise as viewed in FIGURE 5). During this rotation the legs 19 ride up the inclined surfaces of the ribs until they pass the thicker edges of the ribs. The tenons bend slightly to permit this. Then the lugs snap down and securely lock the tenons in place.

It will be noted that lug 19 on tenon 17 locks over rib 13 while the lug on tenon 18 locks over rib 14.

It will be understood, of course, that the joint has a wide variety of uses in structures other than furniture, hence the invention is to be limited only by the scope of the claims.

From the foregoing it will be seen that the invention provides a simple, effective and easily fabricated joint to attach two parts together.

We claim:

1. A mortise and tenon joint between first and second parts, the first part comprising a plate like wall with a flat surface against which the second part abuts and a pair of parallel wedge-shaped ribs on the opposite surface inclining outwardly from each other and from said last named surface, said wall having two circumferentially spaced diametrically opposed identical coaxial arcuate mortises therethrough, two diametrically opposed ends of said mortises being located between the far edges of the ribs and the other ends being substantial distances outside of said ribs, two generally L-shaped tenons on the second part received in said mortises with a leg of each L-shaped tenon overlying the thicker part of a different rib and engaging the latter by snap-on engagement therewith.

2. A mortise and tenon joint as defined in claim 1, wherein said tenons are provided at their free ends with lugs projecting toward the ribbed surface of the first part beyond the far edges of the ribs.

3. A mortise and tenon joint as defined in claim 1, wherein said second part is of rectangular tubular cross-section and said tenons are shaped to an arcuate cross-section to fit into said mortises prior to insertion into the latter.

References Cited in the file of this patent

UNITED STATES PATENTS

| 1,465,793 | Schilling | Aug. 21, 1923 |
| 2,110,136 | Douglas | Mar. 8, 1938 |

FOREIGN PATENTS

| 273,054 | Great Britain | June 30, 1927 |
| 292,665 | Great Britain | June 19, 1928 |